July 21, 1942.　　T. F. SPACKMAN　　2,290,298
AUTOMOBILE HEATER
Filed Dec. 2, 1939　　2 Sheets-Sheet 1

July 21, 1942.  T. F. SPACKMAN  2,290,298
AUTOMOBILE HEATER
Filed Dec. 2, 1939   2 Sheets-Sheet 2

Inventor.
Thomas F. Spackman
By Williams, Bradbury,
McCaleb & Hinkle
Attys.

Patented July 21, 1942

2,290,298

UNITED STATES PATENT OFFICE 2,290,298

AUTOMOBILE HEATER

Thomas F. Spackman, Chicago, Ill., assignor to Stewart-Warner Corporation, Chicago, Ill., a corporation of Virginia Application December 2, 1939, Serial No. 307,206

7 Claims. (Cl. 237—2)

My invention relates to automobile heaters and more particularly to automobile heaters of the internal combustion type.

Automobile heaters of the internal combustion type, are commonly connected with the intake manifold of the automobile engine and operated by the suction existing in this manifold. This suction varies with different conditions of operation of the automobile engine and the variation in the suction is frequently in inverse ratio to the heating requirements of the automobile. It is common to provide some means for compensating for the variation in the vacuum in the intake manifold and an object of my invention is to provide improved compensating means.

Other objects and advantages will become apparent as the description proceeds.

Figure 1:
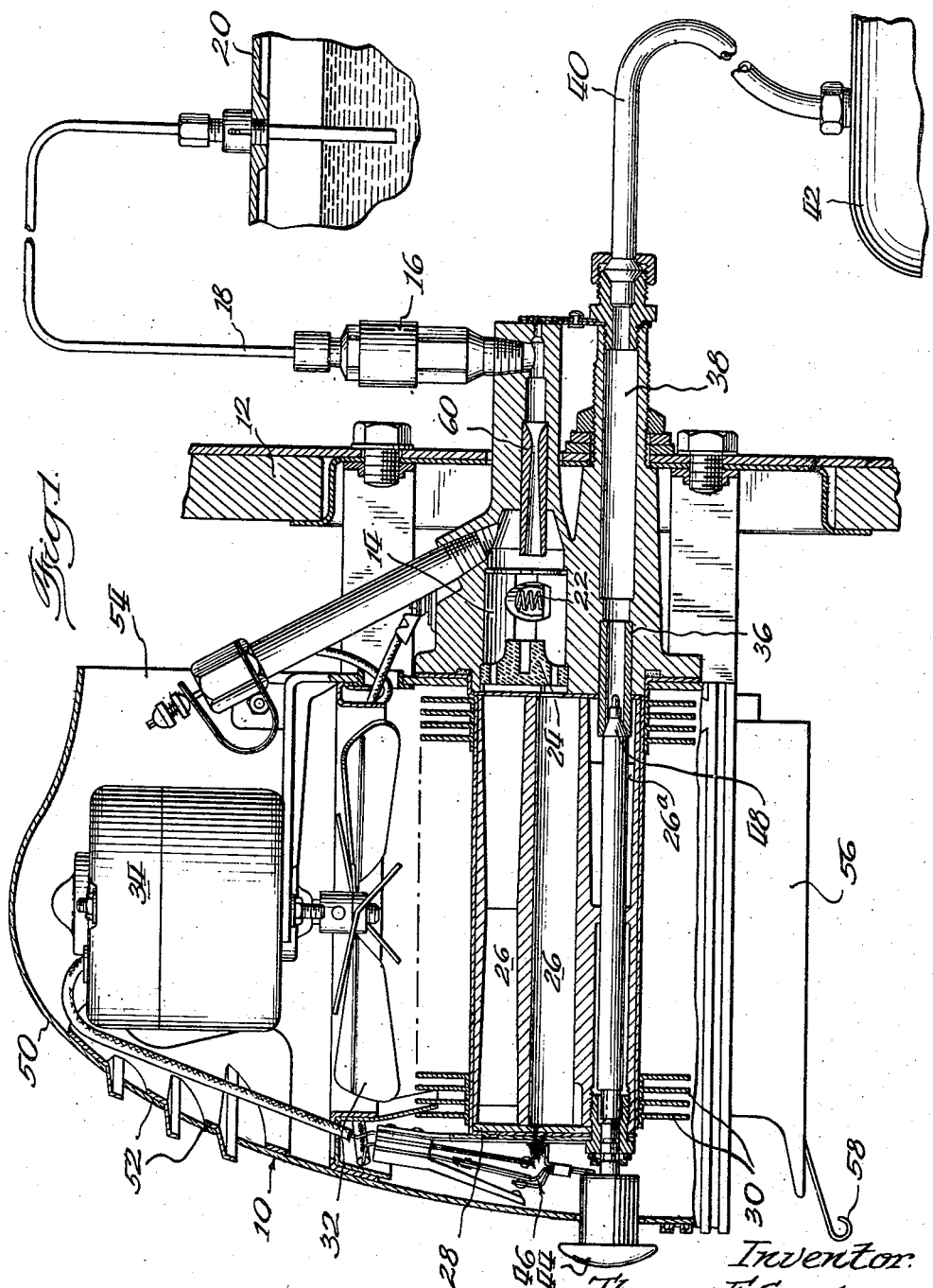
Figure 2:
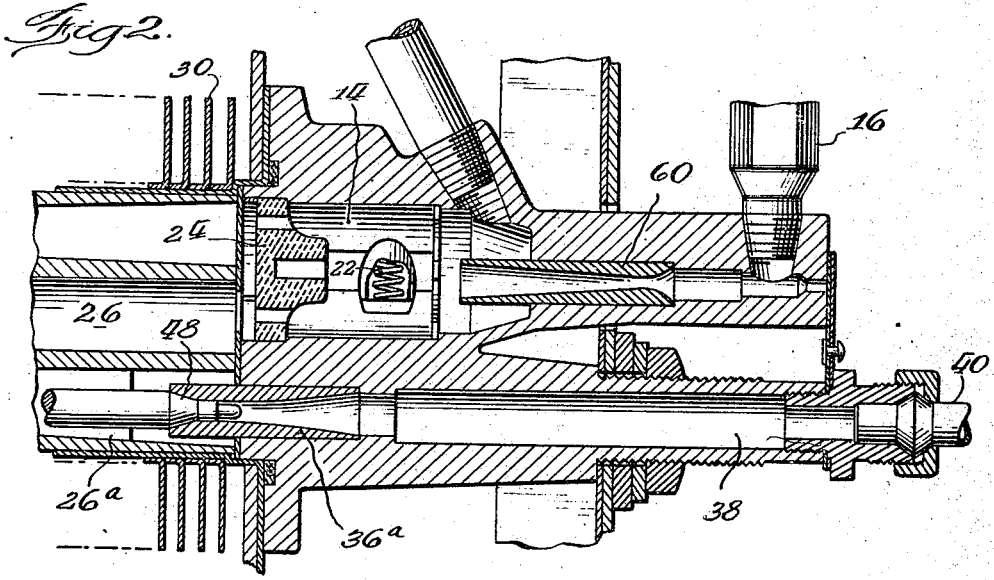
Figure 3:
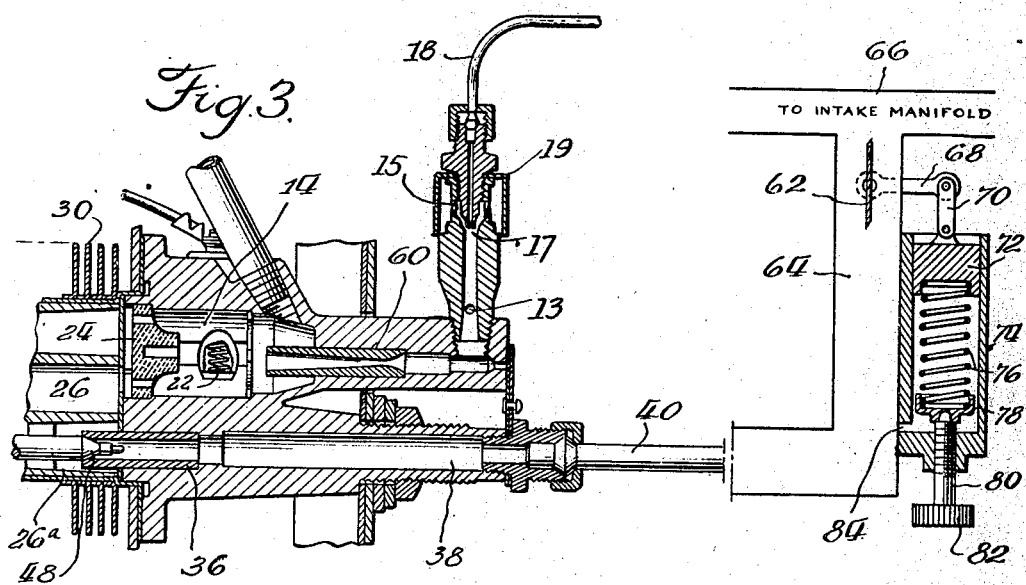

In the drawings, Figure 1 is a vertical sectional view through a heater embodying one form of my invention and diagrammatically illustrating the manner in which this heater is connected to a source of fuel supply and the intake manifold of the automobile engine;

Figure 2 is an enlarged vertical sectional view through a part of a heater illustrating a second embodiment of my invention; and Figure 3 illustrates a third embodiment of my invention and consists of a vertical sectional view through a part of an automobile heater and a diagrammatic illustration of the manner in which this heater is connected to the intake manifold of the automobile engine.

Referring to Figure 1, I have illustrated an automobile heater indicated by the reference numeral 10 and corresponding generally to the disclosure of the application of Henry J. DeN. McCollum, Serial No. 61,213, filed February 28, 1936. The heater 10 is illustrated as being mounted on the dash 12 which separates the engine compartment from the passenger compartment of the conventional automobile.

The heater comprises in general a combustion chamber 14 supplied with fuel by a simple carburetor 16 connected by pipe 18 to a vessel 20 containing gasoline or other suitable fuel. This carburetor may be in the form shown in cross-section in Fig. 3. Air enters the carburetor through the fuel line 18 and is drawn into the center of the Venturi throat 17. Primary air enters through the air inlets 15 and mixes with the fuel. Supplemental air enters through the inlet 13 to dilute the mixture of fuel and air from the throat of the venturi to form a combustible mixture of the correct proportions for proper combustion. A collar 19 is provided to prevent foreign substances from entering the air inlet. The vessel 20 may be the float bowl of the engine carburetor or any other suitable source of fuel. In the combustion chamber is an electrical igniting element 22 and a heat retaining plug 24 which functions in a manner fully described in said McCollum application to ignite and maintain combustion of the combustible mixture supplied by the carburetor 16.

The hot gases resulting from the combustion in the combustion chamber 14 pass into the labyrinth passageways 26 of a heat exchange unit 28 having external fins 30 over which air is circulated by a fan 32 driven by an electric motor 34. The products of combustion leave the labyrinth passageways 26 by way of passageway 26a and thence pass through tubular valve member 36, duct 38, and pipe 40, to the intake manifold 42. The heater is manually controlled by a button 44 which operates switch mechanism 46 controlling the motor 34 and heating element 22. The button 44 also controls a valve 48 cooperating with the tubular seat 36 to regulate communication between the intake manifold and the passageways 26.

The heater 10 is provided with a shell 50 having an attractive shape and exterior finish. This shell provides suitable inlets 52 and 54 through which air is drawn from the passenger compartment by the fan 32. This air is discharged over the fins 30 from which it extracts heat and is discharged through suitable direct louvers mounted in a shiftable plate 56 which may be adjusted by means of handle 58 to direct the flow of heated air as desired.

In the prior art heaters it was usual to make the valve member 36 in the form of a Venturi tube in order to compensate for the effect of variations in intake manifold on the operation of the heater. I have discovered, however, that a greater degree of control can be effected by the structure illustrated in Figure 1 wherein the valve member 36 is a simple tube having no Venturi effect and a Venturi tube 60 is interposed between the combustion chamber 14 and the carburetor 16. In order to understand the difference in operation between my structure and that of the prior art, it will be necessary first to describe in some detail the variation in the intake manifold vacuum.

When the automobile is standing still and the automobile engine is idling, the vacuum in the intake manifold of the automobile engine is a maximum. However, since the automobile is not travelling, the loss of heat from the passenger compartment is not as great as when the automobile is travelling, and correspondingly the heat which must be delivered by the automobile heater is less than when the automobile is travelling. Conversely, when the automobile is travelling at high speed, the heat loss from the passenger compartment is greater and the heating demands on the automobile heater are greater, but under such conditions of automobile operation, the intake manifold vacuum is less than when the engine is idling.

The Venturi tube 60 functions to provide a reasonably uniform flow therethrough for all variations in pressure differential existing thereacross as a result of variations in the vacuum in the intake manifold. One function of the Venturi tube 60 therefore is to provide a substantially constant flow of combustible mixture therethrough for all conditions of engine operation.

I have discovered that the heat produced by the heater lessens as the vacuum in the combustion chamber and labyrinth passageways 26 is increased. When the engine is idling, the throttle valve is closed and the pumping action of the engine cylinders produces a higher vacuum in the intake manifold. When the automobile is in motion, the throttle valve is open, causing a decrease in the intake manifold vacuum. The result of this vacuum variation is to cause the heater to provide a smaller amount of heat when the automobile is not in motion, and a larger amount of heat when the automobile is in motion and more heat is needed to replace that lost by cold air entering the automobile body.

In some instances I have found that the degree of compensation provided by the arrangement of Figure 1 is too great and in the modifications of Figures 2 and 3 I have illustrated different structures for providing still greater nicety of control. In Figure 2 I have shown the Venturi tube 60 located between the carburetor 16 and the combustion chamber 14 and I have illustrated a second Venturi tube 36a located between the passageways 26 and the intake manifold and used in lieu of the tubular valve member 36 of the embodiment of Figure 1.

The embodiment of Figure 3 resembles the embodiment of Figure 1 in that a Venturi tube 60 is located between the carburetor 16 and the combustion chamber 14 and a plain tubular valve member 36 is utilized at the discharge outlet of the passage 26a. In this embodiment, however, I have interposed additional compensating means between the heater and the intake manifold.

This additional compensating means comprises a butterfly valve 62 mounted in a passage 64 connecting the heater with the intake manifold 66. The valve 62 has an arm 68 connected by link 70 to a piston 72 in a cylinder 74 adjacent and preferably but not necessarily attached to said passage.

The piston 72 is urged to valve opening position by a spring 76 resting in a cup 78 mounted on a threaded shaft 80 which may be rotated by a knob 82 to adjust the tension of the spring 76. Port 84 connects the interior of the cylinder 74 with passage 64 whereby the position of the piston 72 and valve 62 are controlled by the degree of vacuum existing in that part of the passage 64 which is adjacent the port 84.

It will be noted that in each of the embodiments illustrated herein, the Venturi tube 60 is adjacent the carburetor 16 but has no effect whatsoever on the richness of the mixture delivered thereby. Likewise, in each embodiment, the Venturi tube 60 tends to minimize the effect of variation in manifold suction on the quantity of combustible mixture delivered to the combustion chamber and further functions as a restriction to maintain the combustion chamber and passageways 26 at a higher degree of vacuum than the carburetor 16.

While I have illustrated and described only three embodiments of my invention, it is to be understood that my invention may assume numerous forms in addition to those illustrated and described herein, and it is my intention to cover such other forms of my invention by the claims herein.

I claim:

1. In an automobile heater adapted to be operated by the varying vacuum in the intake manifold of the automobile engine, the combination of a combustion chamber, a carburetor for supplying a combustible mixture to said chamber, a Venturi shaped restriction means, the throat of which is so proportioned that the absolute pressure in said throat will approach zero when the flow of said combustible mixture therethrough reaches a predetermined maximum, interposed between said carburetor and said combustion chamber, and means connecting said combustion chamber with said intake manifold.

2. In an internal combustion heater connected to a variable source of vacuum, the combination of a combustion chamber, means supplying a combustible mixture to said chamber, compensating means, comprising a flow restriction so proportioned that the flow of combustible mixture therethrough, approaches a predetermined maximum critical value over the operating range of the pressure differential across said restriction, interposed between said first named means and said combustion chamber, means connecting said combustion chamber with said variable source of vacuum, and additional compensating means to prevent the vacuum in said combustion chamber from exceeding a predetermined maximum value, irrespective of variation in the intensity of said source of vacuum, interposed between said combustion chamber and said source of vacuum.

3. In an automobile heater adapted to be operated by the varying vacuum in the intake manifold of the automobile engine, the combination of a combustion chamber, means for supplying a combustible mixture to said chamber, compensating means, comprising a flow restriction proportioned so that the rate of flow of combustible mixture therethrough remains substantially constant at a critical value throughout the normal operating range of the pressure differential across said restriction, interposed between said first named means and said combustion chamber, and means for connecting said combustion chamber with said intake manifold.

4. In an internal combustion heater connected to a variable source of vacuum, the combination of a combustion chamber, means supplying a combustible mixture to said chamber, a Venturi tube, the throat of which is so proportioned that the pressure therein approaches absolute zero when the rate of flow of combustible mixture therethrough reaches a predetermined maximum, interposed between said means and said combustion chamber, means connecting said combustion chamber with said variable source of vacuum, and a second Venturi tube in said connecting means.

5. In an internal combustion heater connected to a variable source of vacuum, the combination of a combustion chamber, means supplying a combustible mixture to said chamber, a flow restriction of such size as to prevent the rate of flow of combustible mixture therethrough from exceeding a predetermined maximum within the operating range of the variable source of vacuum, interposed between said means and said combustion chamber, and means connecting said combustion chamber with said variable source of vacuum.

6. In an internal combustion heater connected to a variable source of vacuum, the combination of a combustion chamber, means supplying a combustible mixture to said chamber, a Venturi tube, having a throat of such size as to keep the rate of flow of combustible mixture therethrough substantially uniform over the operating range of variation in the pressure differential across said tube, interposed between said means and said combustion chamber, heat exchange means heated by the products of combustion from said chamber, means connecting said last named means with said variable source of vacuum, and a vacuum operated valve responsive to the intensity of the vacuum in said combustion chamber in said connecting means to prevent the vacuum in said combustion chamber from exceeding the predetermined maximum value.

7. In an automobile heater adapted to be operated by the varying vacuum in the intake manifold of the automobile engine, the combination of a combustion chamber, a carburetor for supplying a combustible mixture to said chamber, a flow restriction interposed between said carburetor and said combustion chamber, said restriction being of such size as to prevent the rate of flow of combustible mixture therethrough from exceeding a predetermined maximum within the operating range of the pressure differential across said restriction, and means connecting said combustion chamber with said intake manifold, said last named means including a second flow restriction.

THOMAS F. SPACKMAN.